United States Patent [19]

Jäckel

[11] Patent Number: 5,794,750
[45] Date of Patent: Aug. 18, 1998

[54] TORQUE TRANSMITTING APPARATUS

[75] Inventor: Johann Jäckel, Baden-Baden, Germany

[73] Assignee: LuK Lamellen und Kupplungsbau GmbH, Bühl, Germany

[21] Appl. No.: 743,137

[22] Filed: Nov. 4, 1996

Related U.S. Application Data

[63] Continuation of Ser. No. 316,403, Sep. 30, 1994, abandoned, which is a continuation of Ser. No. 44,031, Apr. 7, 1993, abandoned.

[30] Foreign Application Priority Data

Apr. 18, 1992 [DE] Germany ............... 42 12 954

[51] Int. Cl.$^6$ .................................................. E16D 13/00
[52] U.S. Cl. ..................... 192/70.17; 464/68; 74/574
[58] Field of Search ............... 192/55.61, 70.17, 192/70.18, 70.27, 70.14, 107 M, 212; 74/574; 464/24, 68

[56] References Cited

U.S. PATENT DOCUMENTS

| | | |
|---|---|---|
| 2,217,078 | 10/1940 | Reed. |
| 4,020,937 | 5/1977 | Winter .................. 192/107 R |
| 4,114,741 | 9/1978 | Lindquist .............. 192/107 R |
| 4,570,772 | 2/1986 | Alas et al. ............. 192/70.18 |
| 4,895,237 | 1/1990 | Maucher ............... 192/106.2 |
| 5,042,632 | 8/1991 | Jäckal .................. 74/574 X |
| 5,125,872 | 6/1992 | Reik .................... 74/574 X |
| 5,156,249 | 10/1992 | Friedmann ............. 192/106.2 |
| 5,160,007 | 11/1992 | Reik et al. ............. 192/70.17 |

FOREIGN PATENT DOCUMENTS 2758366  6/1978  Germany.

*Primary Examiner*—Richard M. Lorence
*Attorney, Agent, or Firm*—Darby & Darby

[57] ABSTRACT

A torque transmitting apparatus which can be used as a friction clutch in the power train between the output element of the engine and the input element of the transmission of a motor vehicle has a pressure plate which cooperates with a counterpressure plate to clamp a clutch disc when the clutch is engaged. The counterpressure plate is the secondary flywheel of a composite flywheel assembly whose primary flywheel is affixed to the output element of the engine. The pressure plate and/or the counterpressure plate and/or the primary flywheel can constitute a stamping or a forging. The counterpressure plate is provided with outwardly extending arms which stress the coil springs of a damper installed in an annular chamber of the primary flywheel and serving to oppose rotation of the primary flywheel and the counterpressure plate relative to each other.

54 Claims, 7 Drawing Sheets

TORQUE TRANSMITTING APPARATUS

This is a continuation of application Ser. No. 08/316,403, filed Sep. 30, 1994, now abandoned which is a continuation of Ser. No. 08/044,031, filed Apr. 7, 1993, now abandoned.

BACKGROUND OF THE INVENTION

The invention relates to improvements in torque transmitting apparatus, for example, to improvements in apparatus which include or constitute friction clutches. Still more particularly, the invention relates to improvements in torque transmitting apparatus of the type wherein a clutch disc can be clamped between a rotary pressure plate and a rotary counterpressure plate, the pressure plate being movable axially toward the counterpressure plate under the bias of a diaphragm spring or other suitable energy storing means to thus compel the clutch disc to rotate with the two plates. Torque transmitting apparatus of the above outlined character are often provided in the power trains of motor vehicles in order to enable a driver to change the ratio of a variable speed transmission. Disengagement of the apparatus interrupts the power flow from the output element of the combustion engine to the input element of the transmission in the vehicle. Reference may be had to German Auslegeschrift No. 27 58 366 which discloses a clutch employing a diaphragm spring, and to U.S. Pat. No. 2,217,078 which discloses a clutch wherein the engagement or disengagement involves the actuation of a lever.

OBJECTS OF THE INVENTION

An object of the invention is to provide a torque transmitting apparatus whose component parts can be mass-produced in a simple and inexpensive manner without affecting their reliability and life expectancy.

Another object of the invention is to provide a novel and improved friction clutch, for example, to be used in the power trains of motor vehicles.

A further object of the invention is to provide novel and improved pressure plates and counterpressure plates for use in torque transmitting apparatus of the above outlined character.

An additional object of the invention is to provide a power train which embodies a torque transmitting apparatus of the above outlined character.

Still another object of the invention is to provide a torque transmitting apparatus whose life expectancy is longer than that of conventional apparatus.

A further object of the invention is to provide a novel and improved method of making component parts of torque transmitting apparatus.

Another object of the invention is to provide a novel and improved method of assembling component parts of a torque transmitting apparatus.

An additional object of the invention is to provide a torque transmitting apparatus which can be utilized as a superior substitute for conventional torque transmitting apparatus in existing power trains of motor vehicles.

Still another object of the invention is to provide the above outlined torque transmitting apparatus with novel and improved means for establishing connections between driving and driven parts.

A further object of the invention is to provide a motor vehicle or another machine which employs one or more torque transmitting apparatus of the above outlined character.

Another object of the invention is to provide a novel and improved dry friction clutch.

SUMMARY OF THE INVENTION

One feature of the invention resides in the provision of a torque transmitting apparatus which can constitute a friction clutch. The improved apparatus comprises coaxial rotary pressure and counterpressure plates and a clutch disc between the two plates. The pressure plate is movable by energy storing means axially toward the counterpressure plate to thereby clamp the clutch disc between the two plates, and at least one of the two plates constitutes a massive stamping or a forging. The at least one plate which is a stamping is preferably the pressure plate and is provided with torque transmitting means; such torque transmitting means can be a separately produced component which is affixed to the pressure plate or to another massively formed part of and of one piece with the pressure plate. The counterpressure plate can comprise stamped torque transmitting means, and such stamped torque transmitting means can constitute a processed part or a massively formed part of the counterpressure plate.

At least one of the two plates can form part of a dry friction clutch.

The aforementioned stamping can include at least one embossed portion, and such at least one embossed portion can include or can form part of torque transmitting means. The stamping can be provided with at least one stamped out opening which can be configurated and dimensioned to receive and/or to permit passage of fastener means and/or tools. In addition to or in lieu of the just outlined purpose, the at least one opening can constitute an aerating or ventilating or cooling opening.

The pressure plate can be provided with at least one embossed and/or stamped fastening portion for disengaging and/or torque transmitting means. For example, the fastening portion or portions can be connected with torque transmitting means in the form of one or more leaf springs.

A rotary clutch component (e.g., a clutch cover or housing) can be connected with the pressure plate by one or more leaf springs.

At least one abutment can be provided between the pressure plate and at least one energy storing element of the torque transmitting apparatus. The at least one energy storing element can form part of the aforementioned energy storing means. Such at least one energy storing element can include or constitute a diaphragm spring. The at least one abutment can constitute a shaped portion of the diaphragm spring. Alternatively, the at least one abutment can be provided on the pressure plate.

The counterpressure plate can comprise means for connecting it with the aforementioned clutch cover or housing. The connecting means can be provided with at least one contact surface extending radially and/or axially of the counterpressure plate.

At least one stamped aerating, cooling and/or ventilating opening can be provided in a radially outer portion of the counterpressure plate.

The torque transmitting apparatus can further comprise a flywheel assembly including a primary flywheel which can be driven by the crankshaft or by an otherwise configurated output element of an internal combustion engine, and a secondary flywheel which includes the counterpressure plate. The aforementioned abutment or abutments for the energy storing element or elements can be provided at a radially outer portion of the abutment and such abutment or abutments can be of one piece with the counterpressure plate. For example, the abutment or abutments can constitute stamped portions of the counterpressure plate. Each such abutment can have at least one surface extending substantially radially of the counterpressure plate. The abutment or abutments can be disposed radially outwardly of the clutch cover or housing which is connected to and rotates with one of the plates. If the counterpressure plate comprises a plurality of abutments for energy storing elements, such abutments are spaced apart from each other in the circumferential direction of the counterpressure plate.

The primary flywheel of the flywheel assembly can define at least a portion of a preferably annular chamber for the energy storing means and for the abutment or abutments of the counterpressure plate. The energy storing means can be constructed, configurated and mounted in such a way that it tends to move radially outwardly away from the common axis of the two plates at least in response to rotation of the flywheel assembly, and the chamber can be provided with at least one stop (e.g., a shroud) which is engaged by the energy storing means at least while the energy storing means is acted upon by centrifugal force. A radially outer portion of the energy storing means can bear against at least one wear reducing insert which forms part of the stop and is disposed between the radially outer portion of the energy storing means and the primary flywheel.

As already mentioned above, the improved torque transmitting apparatus preferably comprises means for connecting the counterpressure plate with the clutch cover or housing.

A sealing element for the aforementioned chamber can be provided on the counterpressure plate and/or on the clutch cover; a resilient radially inner portion of such sealing element can be caused to bear against the primary flywheel in the axial direction of the two plates. The sealing element can form part of a friction generating device which is installed between the two flywheels.

The connection between the counterpressure plate and the clutch cover can be a form-locking connection which is operative at least in the circumferential direction of the two plates.

The sealing element can be coaxial with the clutch cover and with the counterpressure plate. At least one of these parts can overlie another of these parts or both other parts in the axial direction of the two plates. Furthermore, one of these parts can be bonded to one of the other parts or to both other parts. For example, at least two of these parts or all three parts can be welded to each other. Such welding can include a single welding operation which can be carried out by a laser welding machine. At least one of the three parts can include a plurality of segments which are spaced apart from each other in the circumferential direction of the two plates and are welded to one or both of the other two parts. The bonding can involve welding substantially radially inwardly toward the common axis of the two plates.

Another feature of the invention resides in the provision of a torque transmitting apparatus which comprises a first flywheel connectable to a combustion engine, a second flywheel which is rotatable relative to the first flywheel and is connectable with a transmission by a friction clutch, antifriction bearing means between the flywheels, and a damper which serves to oppose rotation of the flywheels relative to each other. The clutch comprises a rotary pressure plate, a rotary counterpressure plate coaxial with the pressure plate and a clutch disc between the two plates. At least one of the two plates constitutes a solid stamping or a forging. The counterpressure plate can form part of the second flywheel, and the clutch disc can be connected with a rotary input element of the transmission. The pressure plate comprises torque transmitting means which is a separately produced component affixed to the pressure plate or a massively formed part of and of one piece with the pressure plate. The counterpressure plate can comprise stamped torque transmitting means constituting a processed part or a massively formed part of the counterpressure plate. The friction clutch is or can constitute a dry friction clutch.

The novel features which are considered as characteristic of the invention are set forth in particular in the appended claims. The improved torque transmitting apparatus itself, however, both as to its construction and the mode of making and assembling the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
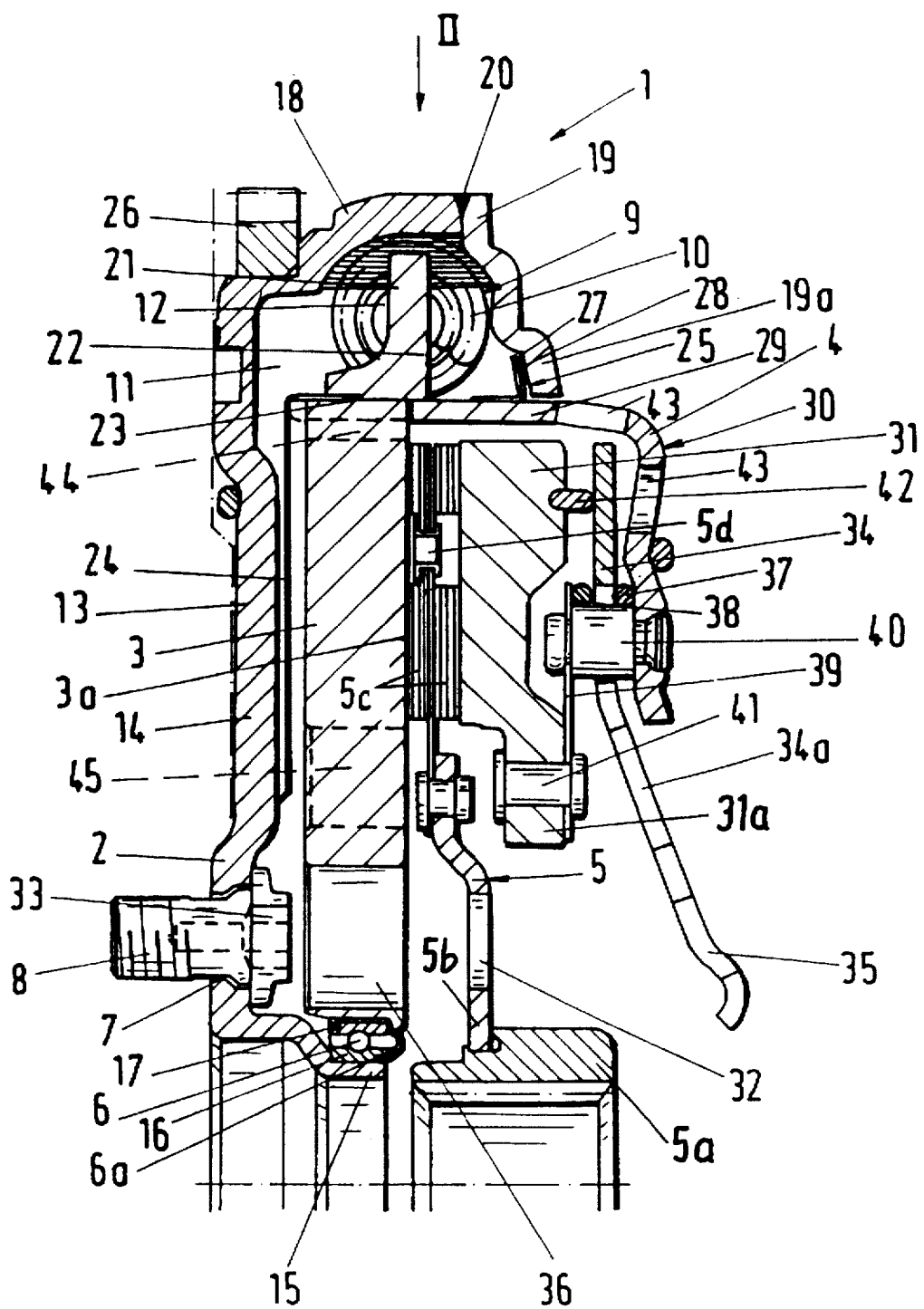
FIG. 1 is a fragmentary axial sectional view of a torque transmitting apparatus which embodies one form of the invention and wherein the counterpressure plate constitutes the secondary flywheel of a composite flywheel assembly.

The torque transmitting apparatus 1 which is shown in FIG. 1 comprises a split (two-piece) flywheel assembly including a first or primary flywheel 2 and a second or secondary flywheel 3 coaxial with and rotatable relative to the flywheel 2. The primary flywheel 2 is separably affixed to the output element (e.g., crankshaft) of an internal combustion engine in a motor vehicle by a set of bolts 8 or by other suitable fasteners. The secondary flywheel 3 includes or constitutes the counterpressure plate of a dry friction clutch 4 which further comprises a housing or cover 30, an axially movable pressure plate 31 coaxial with the counterpressure plate 3, a clutch plate or clutch disc 5 between the plates 3, 31, and a diaphragm spring 34 serving as a means for biasing the pressure plate 31 axially toward the counterpressure plate 3 when the clutch 4 is engaged; this ensures that the friction linings of the clutch disc 5 are clamped between the friction surface 3a of the counterpressure plate 3 and the adjacent friction surface of the pressure plate 3 so that the hub 5a of the clutch disc 5 can transmit torque to the input element (e.g., a shaft) of a variable speed transmission in the motor vehicle.

FIG. 1 shows a relatively simple clutch disc 5 which merely comprises the hub 5a, a disc 5b which is rigid with and surrounds the hub 5a, and friction linings 5c at both sides of the radially outer portion of the disc 5b. The friction clutch 4 can employ a more sophisticated clutch disc with one or more dampers or friction generating devices between the friction linings 5c and the hub 5a. Reference may be had, for example, to commonly owned U.S. Pat. No. 4,895,237 granted Jan. 23, 1990 to Paul Maucher. Furthermore, the clutch disc 5 can be provided with resilient cushioning elements between the disc 5b and the friction linings 5c as disclosed, for example, in commonly owned copending patent application Ser. No. 08/021,873 filed Feb. 24, 1993 by Paul Maucher. Still further, the discrete rivets 5d which connect the friction linings 5c to the disc 5b can be replaced by rivets forming integral parts of the disc 5b.

The primary flywheel 2 has a radially innermost portion 15 which is surrounded by the inner race 16 of an antifriction bearing 6. The outer race 17 of the bearing 6 is surrounded by the radially innermost portion of the secondary flywheel or counterpressure plate 3. The bearing 6 is installed radially inwardly of openings in the form of holes 7 which are provided in the primary flywheel 2 for the externally threaded shanks of the fasteners 8 which serve to secure the primary flywheel 2 to the output element of the engine. The illustrated antifriction bearing 6 has a single row of spherical rolling elements between the races 16, 17 and a ring-shaped cap 6a serving to confine a supply of grease or other suitable lubricant for the rolling elements. The cap 6a can further serve as a thermal insulator which prevents the transfer of heat (or at least reduces the transfer of heat) from the relatively hot secondary flywheel 3 to the cooler flywheel 2 and/or to the bearing 6. The secondary flywheel 3 is heated at its surface 3a when the latter slides relative to the adjacent friction lining 5c of the clutch disc 5.

A damper 9 is provided between the flywheels 2 and 3 to yieldably oppose rotation of such flywheels relative to one another. The illustrated damper 9 comprises energy storing means including a set of arcuate energy storing elements 10 in the form of coil springs confined in an annular space or chamber 11 defined at least in part by the primary flywheel 2. The springs 10 are actually installed in a radially outermost portion or compartment 12 of the chamber 11. The latter is at least partially filled by a viscous medium which is preferably a lubricant and can be of oily or greasy (pasty) consistency.

The major part of the primary flywheel 2 is constituted by a primarily radially extending disc-shaped portion 13 which can be made by drawing or from metallic sheet material and is of one piece with the aforementioned radially innermost portion 15 carrying the inner race 16 of the bearing 6. The holes or openings 7 are provided in the disc-shaped portion 13 close to the radially innermost portion 15. The latter is actually of one piece with a radially extending part 14 of the disc-shaped portion 13 of the primary flywheel 2. The inner race 16 of the bearing 6 abuts an external shoulder of the radially innermost portion 15, and the outer race 17 and/or the heat insulating cap 6a abuts an internal shoulder of the radially innermost portion of the secondary flywheel 3 (hereinafter called counterpressure plate). The plate 3 is substantially flat and extends generally radially of the common axis of the flywheels 2 and 3. The outer race 17 and the cap 6a are fitted into a central opening of the plate 3.

The part 14 of the portion 13 merges radially outwardly into a wall 18 extending in part in parallelism with the axis of the composite flywheel and away from the internal combustion engine so as to surround the radially outermost portions of the chamber 11 and its compartment 12. As can be seen in FIG. 1, the radially outermost portions of the coil springs 10 forming part of the damper 9 in the chamber 11 can directly abut the inner side of the axially extending wall or stop 18 of the primary flywheel 2. A substantially radially inwardly extending wall 19 constitutes a separately produced part of the primary flywheel 2 and is welded (as at 20) to the adjacent portion of the axially extending wall or stop 18. The wall 19 can be made of a metallic sheet material and is provided with protuberances or pockets 19A (FIG. 1a) extending into the compartment 12 between the end convolutions of neighboring coil springs 10 forming part of the damper 9. The radially outer portion of the wall 19 is closely adjacent to or actually abuts the adjacent portions of the coil springs 10. It will be noted that the width of the wall 18 (as measured in the axial direction of the primary flywheel 2) is many times the width of the wall 19.

The radially innermost portion 19a of the wall 19 is slightly frustoconical and extends radially inwardly toward the periphery of the substantially cylindrical radially outermost portion 29 of the clutch cover or housing 30.

The walls 18 and 19 of the primary flywheel 2 define a plurality of arcuate spaces forming part of the compartment 12 and serving for reception of discrete coil springs 10. The aforementioned pockets or protuberances 19A of the wall 19 are aligned with analogous pockets or protuberances 18A (FIG. 1a) of the portion 13 and/or wall 18 and confront each other between the end convolutions of neighboring coil springs 10 to cause the springs to store energy (or to store additional energy) when the primary flywheel 2 turns relative to the counterpressure plate 3 and/or vice versa. Such stressing of the springs 10 is effected in cooperation with abutments or arms 21 which are provided on and constitute the radially outermost portions of the plate 3 radially outwardly of the cover 30. The abutments 21 also extend between neighboring coil springs 10 and are spaced apart from each other in the circumferential direction of the plate 3. The aforementioned protuberances 18A, 19A can constitute integral pockets of the walls 18 and 19. The aforementioned arcuate portions or sections of the compartment 12 for discrete coil springs 10 can be said to constitute arcuate recesses or depressions in the inner sides of the walls 18 and 19.

Each abutment or arm 21 includes a substantially radially extending surface 22 and serves to transmit torque from the primary flywheel 2 to the plate 3 when the engine is on to drive the portion 13. The transmission of torque takes place from the pockets 18A, 19A of the walls 18 and 19 to the coil springs 10, thence to the arms 21 and therefore to the plate 3 which drives the pressure plate 31 and the clutch cover 30 and also the clutch disc 5 when the friction clutch 4 is engaged.

The radially inner portions 23 of the arms 21 are of one piece with the plate 3, and the radially outer portions of the arms 21 engage the adjacent coil springs 10 when the damper 9 is active to transmit torque from the primary flywheel 2 to the plate 3. When the primary flywheel 2 is not driven, the end convolutions of the springs 10 preferably maintain each arm 21 in the space between a pocket 18A of the wall 18 and the aligned pocket 19A of the wall 19.

The arms 21 could constitute separately produced parts which are affixed to or integrated into the plate 3. However, it is presently preferred to make the arms 21 of one piece with the plate 3 because a feature of the invention resides in that the plate 3 is made as a forging or stamping; such operation can involve simultaneous formation of the arms 21 to thus reduce the overall cost of the plate 3 as well as of the entire torque transmitting apparatus 1. For example, the arms 21 can be formed by embossing the major part of the plate 3, i.e., without the need for welded or other bonded connections which could affect the quality of the radially inner portions 23 of the arms 21. Thus, the connections between the arms 21 and the adjacent major part of the plate 3 are much more reliable than if they were to be made by welding, by resorting to rivets or in any other manner which would involve the making of arms 21 independently of the major part of the plate 3 and subsequent attachment of such separately produced arms 21 to the separately produced counterpressure plate. The flow of material of the plate 3 at 23 if the arms 21 are of one piece with the plate 3 and are made simultaneously with such plate by embossing or by resorting to an analogous procedure actually reinforces the one-piece bonds between the main portion of the plate 3 and its arms 21 so that the danger of separation of such arms in actual use of the improved torque transmitting apparatus is much less pronounced than in heretofore known apparatus wherein the abutments of the counterpressure plate are produced in a separate operation and are thereupon welded, riveted or otherwise secured to the separately produced counterpressure plate. It has been found that the just discussed mode of making the arms 21 of one piece with the major portion of the plate 3 (without welding, riveting or a like procedure which must be resorted to if the arms 21 are separately produced parts) contributes significantly to reliability and longer useful life of the counterpressure plate 3 and of the entire apparatus.

It is further within the purview of the invention to make the plate 3 and its arms 21 of one piece in the following way: One starts with a blank (e.g., a stamping) whose radial dimensions are such that its radially outermost portion can be provided with a requisite number of suitably distributed arms or abutments 21 (as seen in the circumferential direction of the counterpressure plate) by removing material from the blank between neighboring arms 21. Additional material can be removed from the arms 21 of the thus treated blank at the one and/or at the other major surface of the blank. This ensures that the arms 21 exhibit accurately finished spring-engaging sides or faces extending in the radial and/or axial direction of the finished counterpressure plate. The just mentioned removal of material from the blank to form the arms 21 can take place simultaneously with or at least in the same machine as the finishing of the friction surface 3a on the plate 3.

The plate 3 can be made of steel, preferably a steel which is susceptible of high-precision stamping or blanking. For example, the material of the plate 3 can be annealed in such a way that perlite is embedded in spherical cementite. At least the arms 21 of the finished plate 3 can be hardened, preferably by resorting to an induction hardening procedure.

That surface of the plate 3 which is located opposite the friction surface 3a can be enlarged to ensure more satisfactory removal of heat. For example, calibration of the plate 3 can involve or include the application of a rhomboidal or similar pattern to that major surface of the plate 3 which confronts the main portion 13 of the primary flywheel 2. It is also possible to provide the surface opposite the friction surface 3a with a helical groove or recess by removing material from the plate 3. Still further, it is possible to treat the left-hand surface of the plate 3 with a ring-shaped milling cutter which is caused to repeatedly penetrate into the plate 3 off center and to thus enhance the cooling effect in order to rapidly dissipate heat which develops in response to engagement or disengagement of the friction clutch 4.

The means for sealing the at least partially filled chamber 11 and for thus preventing the escape of confined oil, grease or another viscous fluid comprises two annular sealing elements 24 and 25. The sealing element 24 includes or constitutes a membrane and is or can be made of one piece. As shown in FIG. 1, the radially outermost portion of the one-piece sealing element 24 is anchored in the radially innermost portions 23 of the arms 21 on the plate 3; to this end, the radially outermost portion of the sealing element 24 extends in a direction away from the engine and can constitute a cylinder whose axis coincides with the axis of the primary flywheel 2. Such cylinder is centered on the plate 3. The major portion of the sealing element 24 extends radially inwardly along the inner side of the main portion 13 of the primary flywheel 2 toward but short of the fasteners 8. Such major portion of the sealing element 24 extends substantially radially of the primary flywheel 2 and its radially innermost part can be provided with a bead or the like to yieldably bear against the inner side of the part 14 with a force which suffices to prevent the confined lubricant from escaping radially inwardly in a direction toward the bearing 6. The resiliency of the sealing element 24 at its radially innermost portion suffices to ensure that such radially innermost portion continues to bear against the inner side of the primary flywheel 2 at a location radially outwardly of the openings 7. The radial dimension of the sealing element 24 can be reduced, even considerably, or the bead (which bears against the primary flywheel 2) can be provided radially outwardly of the location which is shown in FIG. 1, i.e., closer to the compartment 12 of the chamber 11.

The radially extending major portion of the sealing element 24 is substantially coplanar with a starter gear 26 which is a press fit on or is welded or otherwise securely affixed to the wall 18 of the primary flywheel 2.

The second sealing element 25 is a composite structure and is installed to establish a seal at the radially innermost portion 19a of the wall 19, namely between the wall 19 and the peripheral surface of the adjacent substantially cylindrical portion 29 of the clutch cover 30. A first portion 27 of the second sealing element 25 has a substantially L-shaped cross sectional outline with one leg engaging the wall 19 and with the other leg engaging the cover portion 29. The second portion 28 of the sealing element 25 is resilient and is stressed in the axial direction of the plate 3. The illustrated second portion 28 is a diaphragm spring having a radially outer portion which bears against the inner side of the wall 19 and a radially inner portion which urges the first portion 27 axially toward the engine, i.e., toward the main portion 13 of the primary flywheel 2. The angle between the legs of the first portion 27 is preferably less than 90° and its inner diameter is such that it is maintained in satisfactory frictional engagement with the external surface of cylindrical portion 29 of the clutch cover 30.

Though the sealing elements 24, 25 are or can be designed to prevent any escape of viscous fluid from the chamber 11, they are or can be designed primarily to prevent penetration of dust and/or other impurities into the chamber 11 and its compartment 12. The reason is that the chamber 11 is or can be only partially filled with viscous fluid and also that the confined fluid tends to flow radially outwardly into the compartment 12, at least when the primary flywheel 2 is driven by the engine. As a rule, the sealing elements 24 and 25 are or can be designed to prevent the escape of confined fluid only in the unlikely event of overheating when the normally viscous fluid is liquefied and tends to escape from the chamber 11 radially inwardly when the primary flywheel 2 is not driven by the engine.

The dry friction clutch 4, its clutch disc 5 and the primary flywheel 2 of the composite flywheel assembly together constitute a preassembled unit which is assembled at the manufacturing plant and is shipped in preassembled condition so that it can be affixed to the output element (e.g., a crankshaft) of an engine in an automobile assembly plant. Such mounting of the preassembled unit onto the output element of an engine is a simple and time-saving operation because a number of presently required steps can be dispensed with. For example, it is not necessary to center the clutch disc 5, to install the clutch disc 5 between the plates 3 and 31, to mount the clutch 4 independently of the other parts, to insert a centering mandrel which is necessary in accordance with heretofore known procedures, to center of the clutch disc relative to other parts of the clutch 4, to insert the fasteners 8 into the holes 7, and to withdraw the centering mandrel subsequent to attachment of the primary flywheel to the engine.

The antifriction bearing 6 is installed between the primary flywheel 2 and the counterpressure plate 3 before the aforementioned preassembled unit is shipped to the automobile making plant. Thus, the inner race 16 surrounds the radially innermost portion 15 of the primary flywheel 2, the portion 15 being preferably of one piece with the portions 13, 14 and 18 of the primary flywheel. The fasteners 8 are preferably installed in their openings 7 prior to shipping the preassembled unit from the manufacturing plant so that the persons or robots at the automobile making plant need not waste any time for insertion of the fasteners 8; the fasteners are ready to be driven into the output element of the engine. The fastener 8 which is shown in FIG. 1 has a head with a polygonal (preferably hexagonal) socket 33 for the working end of a suitable torque transmitting tool which is inserted through an aligned opening or window 36 in the plate 3 and through an aligned opening or window 32 in the disc 5b of the clutch disc 5. The preassembled unit can be furnished with removable or destructible retaining means 208a (FIG. 6) for holding the fasteners 8 in optimum positions to be driven into tapped bores or holes in the output element of an engine. This, too, simplifies the task of installing the preassembled unit in a motor vehicle at the automobile making plant. The retaining means 208a is constructed and mounted in such a way that the temporary connection between a fastener 8 and the primary flywheel 2 is terminated in response to proper application of a suitable torque transmitting tool.

The clutch disc 5 is centered between the pressure plate 3 and the friction surface 3a of the counterpressure plate 3 so that its axis coincides with the axis of the output element of the engine when the output element is connected with the primary flywheel 2. At the time the primary flywheel 2 is to be affixed to the output element of the engine, the windows 32 of the disc 5b are in register with the windows 36 in the plate 3 as well as with the openings 7 in the primary flywheel 2. This renders it possible to insert a tool into the sockets 33 in the heads of the fasteners 8 which are held in the respective openings 7 and are ready to be driven into the tapped bores or holes of the output element. The windows 32 in the disc 5b are smaller than the heads of the fasteners 8; this ensures that, once moved to the position which is shown in FIG. 1, a fastener 8 cannot become lost even if it is not exactly centered in its opening 7. In other words, the fasteners 8 form part of the preassembled unit including the primary flywheel 2, the plates 3, 31 and the clutch disc 5.

The diaphragm spring 34 includes a circumferentially complete radially outer portion and substantially radially inwardly extending prongs 34a separated from each other by substantially radially extending slots. The prongs 34a are provided with openings or windows 35 which are aligned with the windows 32 when the preassembled unit is ready to be affixed to the output element of an engine. The windows 35 permit the working end of a torque transmitting tool to enter the aligned sockets 33 by passing through the aligned windows 32 and 36. The windows 35 can constitute enlarged portions of slots between neighboring prongs 34a of the diaphragm spring 34. The just described mode of affording access to the sockets 33 of the fasteners 8 simplifies the mounting of the preassembled unit on the output element of an engine.

The clutch 4 which is shown in FIG. 1 is of the (so-called push) type wherein the radially innermost portions of the prongs 34a of the diaphragm spring 34 must be depressed in a direction toward the counterpressure plate 3 in order to relax the bias of the spring 34 upon the pressure plate 31, i.e., to disengage the clutch. However, the invention can be embodied with equal or similar advantage in torque transmitting apparatus which employ or constitute so-called pull-type friction clutches, i.e., wherein the radially innermost portions of the prongs 34a must be pulled in a direction away from the counterpressure plate in order to disengage the clutch.

The clutch 4 further comprises two seats 37, 38 for the radially outer portion of the diaphragm spring 34. The seats 37 and 38 permit tilting of the diaphragm spring 34 with reference to the cover 30. The seat 37 is installed between the inner side of the cover 30 and the adjacent side of the diaphragm spring 34, and the seat 38 is installed between the other side of the diaphragm spring and a set of torque transmitting and clutch disengaging elements 39 in the form of leaf springs which couple the pressure plate 31 to the cover 30 in such a way that the pressure plate is free to move axially toward and away from the counterpressure plate 3 but cannot turn relative to the plate 3 and/or cover 30. Rivets 40 are provided to secure the adjacent end portions of the leaf springs 39 to the cover 30 of the friction clutch 4, and more particularly to that portion of the cover 30 which extends substantially radially of the common axis of the plates 3 and 31. Several discrete leaf springs 39 can be replaced with a single (e.g., star-shaped) torque transmitting element which is designed to transmit torque between the cover 30 and the pressure plate 31 as well as to permit the pressure plate 31 to move (within limits) axially of the clutch 4 in order to engage or to become disengaged from the adjacent friction lining 5c of the clutch disc 5. In the embodiment of FIG. 1, the leaf springs 39 are installed in stressed condition to urge the pressure plate 31 axially and away from the clutch disc 5, i.e., to disengage the clutch 4. The radially inner end portions of the leaf springs 39 are secured to the pressure plate 31 by rivets 41; these rivets are mounted radially inwardly of the friction linings 5c, preferably on radially inwardly extending torque transmitting projections 31a of the pressure plate 31. However, it is equally within the purview of the invention to replace the rivets 41 with blind rivets which secure the leaf springs 39 (or a one-piece equivalent of such leaf springs) to the pressure plate 31 opposite the friction linings 5c, i.e., opposite the friction surface 3a of the counterpressure plate 3. The just outlined modification is particularly desirable and advantageous if the pressure plate 31 is a stamping or a forging which can be formed in a manner similar to that described hereinbefore in connection with the primary flywheel 2.

The character 42 denotes in FIG. 1 a separately produced ring-shaped abutment or stop which is partially recessed into a groove in the radially outer portion of the pressure plate 31 and is engaged by the circumferentially complete radially outer portion of the diaphragm spring 34 when the friction clutch 4 is engaged. A similar abutment or stop can be provided if the projections 31a are omitted and the pressure plate 31 constitutes a forging or stamping. The part 42 can be bonded or otherwise affixed to the pressure plate 31.

If the friction clutch 4 of FIG. 1 is replaced with a pull-type friction clutch, those end portions of the leaf springs 39 which are to be affixed to the pressure plate 31 are preferably moved radially outwardly beyond the positions of the rivets 41 in FIG. 1 and one can provide (if necessary) separate fastener means for securing each leaf spring 39 to the cover 30, i.e., the rivets 40 then serve the sole purpose of affixing the seats 37, 38 and the radially outer portion of the diaphragm spring 34 to the cover 30.

In addition to establishing paths from the windows 32 in the disc 5b to the openings 7 in the primary flywheel 2, the windows 36 in the counterpressure plate 3 further serve as openings or passages which permit circulation of air serving to remove heat from the plate 3. Thus, the windows 36 can be said to constitute aerating, cooling or ventilating openings which prevent an overheating of the plate 3 as well as of the entire torque transmitting apparatus. Additional aerating, cooling or ventilating openings 45 are provided in the counterpressure plate 3 radially outwardly of the windows 36 and close to the radially inner portion of the friction surface 3a. Still further, the cover 30 of the clutch 4 is provided with two sets of aerating or cooling openings 43 which are provided in the substantially cylindrical radially outer portion 29 as well as in the radially extending portion of the cover. The counterpressure plate 3 (which is or can constitute a stamping of steel) can be provided with additional aerating, ventilating or cooling openings 44 radially outwardly of the friction surface 3a, i.e., close to the radial level of the regions (at 23) where the spring-engaging arms 21 are of one piece with or are affixed to the plate 3. Adequate cooling of the counterpressure plate 3 as well as of the entire torque transmitting apparatus is desirable and advantageous for a number of reasons. For example, such cooling reduces the likelihood of undesirable reduction of viscosity of the fluid which is confined in the annular chamber 11; a portion of such fluid could possibly escape from the chamber 11 along the sealing element 24 and/or 25 when the engine is idle. Moreover, adequate cooling prolongs the useful life of the parts which are most likely to be heated as well as the useful life of the entire torque transmitting apparatus.

In order to assemble the aforementioned unit, the friction clutch 4 (including the counterpressure plate 3 and the clutch disc 5) is assembled with the sealing element 24 in a first step. The thus obtained partially assembled unit is axially aligned with and is placed adjacent the main portion 13 of the primary flywheel 2; at such time, the flywheel 2 is already assembled with the antifriction bearing 6 and the shanks of the fasteners 8 can already extend into the respective openings 7. The coil springs 10 are inserted into the compartment 12 of the chamber 11, and the wall 19 is then placed against the adjacent end face of the wall 18 to be welded (as at 20) to the wall 18. At such time, the radially inner portion 19a of the wall 19 surrounds the substantially axially extending (i.e., substantially cylindrical) radially outermost portion 29 of the clutch cover 30. The sealing element 25 is pushed along the external surface of the cover portion 29 toward the illustrated position in response to slipping of the radially inner portion 19a of the wall 19 onto the cover portion 29 and in response to subsequent axial displacement of the wall 19 and cover 30 relative to each other. The radially inner portion 19a of the wall 19 bears against the diaphragm spring 28 which, in turn, bears against the radially outwardly extending leg of the first portion 27. When the making of the welded seam 20 is completed, the diaphragm spring 28 can compensate for some elastic relaxation or loosening of the adjacent parts in that it dissipates some of the stored energy to thus close the gap (if any) between the internal surface of the radially inner portion 19a of the wall 19 and the axially extending leg of the portion 27 of the sealing element 25. Thus, the sealing action of the element 25 is established in spite of some relaxation subsequent to completion of the welded seam 20. Such position of the diaphragm spring 28 is shown in FIG. 1.

The preassembled unit can further comprise a pilot bearing (not shown) within the substantially cylindrical axially extending portion 15 of the primary flywheel 2; such pilot bearing can receive the end portion of the input element of the variable speed transmission which receives torque from the hub 5a of the clutch disc 5 when the engine is on and the clutch 4 is engaged so that the plates 3, 31 clamp the friction linings 5c and the hub 5a is compelled to rotate with the primary flywheel 2.

It is further possible to replace the damper 9 (or to use this damper jointly with) one or more additional dampers whose construction and/or mode of operation departs from that of the damper 9. For example, the damper 9 can be used in combination with or it can be replaced by a damper which becomes effective only when the primary flywheel 2 and the counterpressure plate 3 have already completed a certain angular movement relative to each other from a neutral or starting position.

Figure 3:
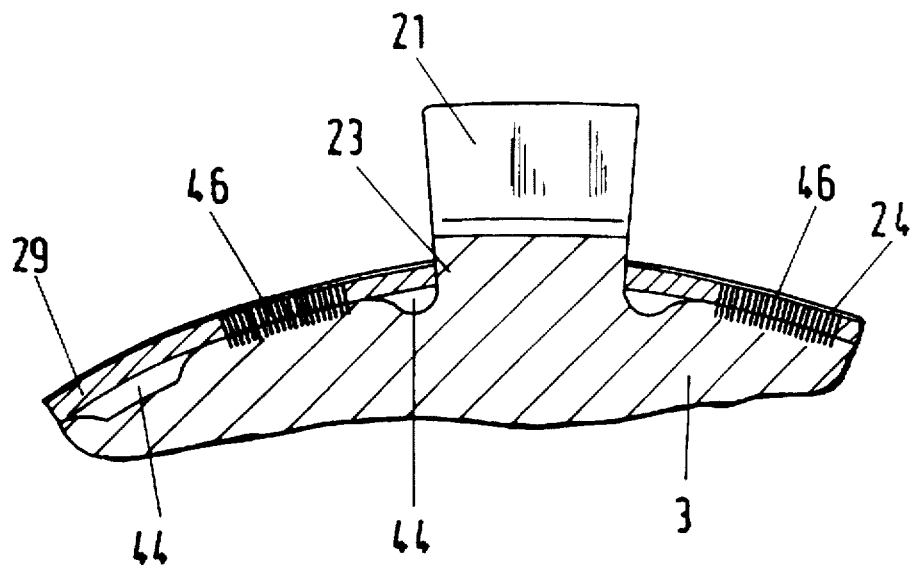
FIG. 3 is a sectional view substantially as seen in the direction of arrows from the line III—III in FIG. 2.
Figure 2:
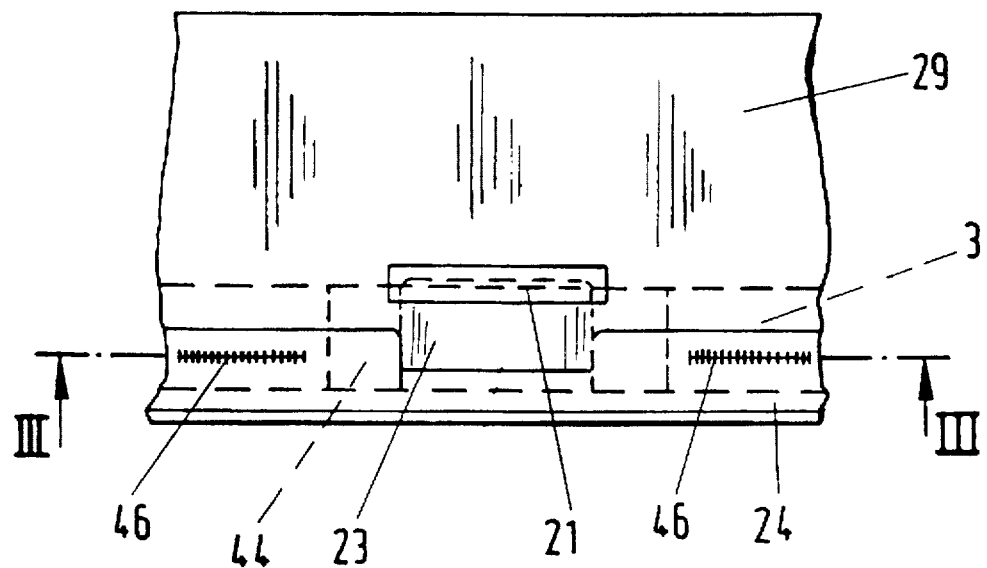
FIG. 2 is an enlarged fragmentary end elevational view substantially as seen in the direction of arrow II in FIG. 1.
Figure 4:
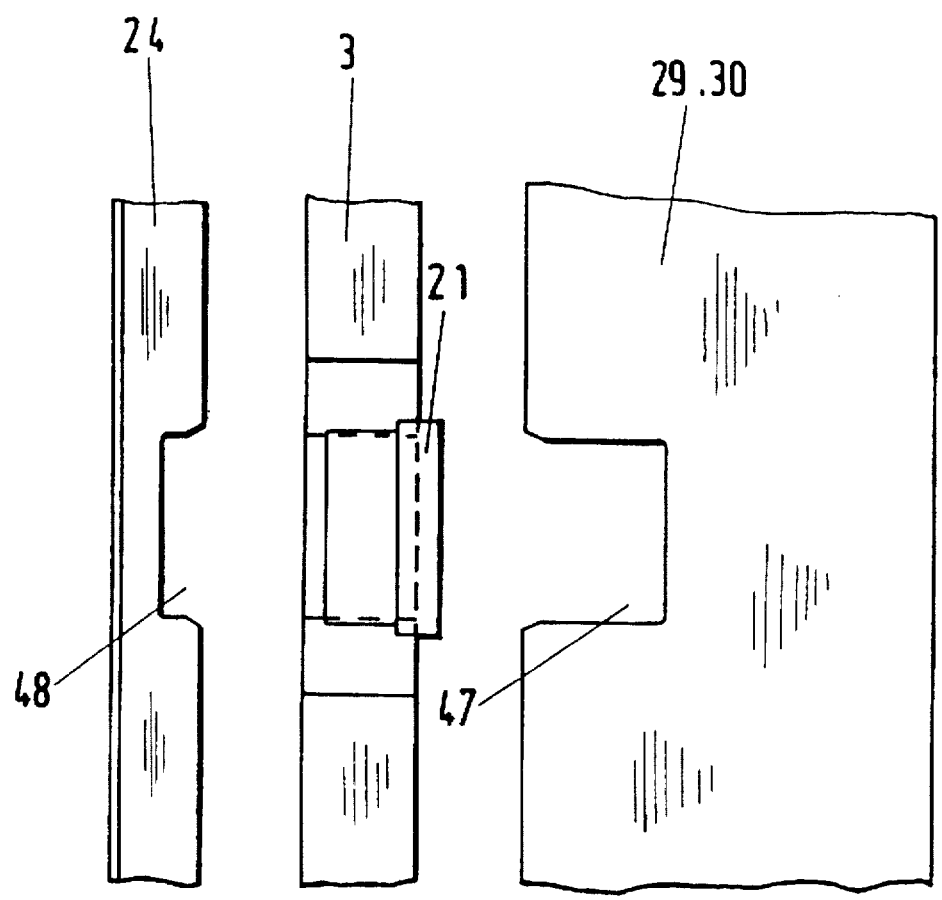
FIG. 4 is an exploded view of certain parts which are shown in FIG. 2 but prior to assembly.

FIGS. 2 to 4 illustrate portions of the forged or stamped counterpressure plate 3, sealing element 24 and clutch cover or housing 30 (including the axially extending radially outermost portion 29) prior as well as subsequent to assembly of these parts. The assembly of these parts is preceded by assembly of other parts of the friction clutch 4 in a manner as already described hereinbefore. Thus, the pressure plate 31 and its ring-shaped abutment 42 are connected to the leaf springs 39 by rivets 41, and the leaf springs 39 are already connected to the radially extending portion of the cover 30 by rivets 40. The rivets 40 further hold the seats 37, 38 and the diaphragm spring 34 in proper positions relative to the clutch cover 30. The clutch disc 5 is inserted between the plates 3 and 31 before the counterpressure plate 3 is assembled with the cover 30. The properly inserted clutch disc 5 is centered relative to the friction surface 3a of the plate 3 and the pressure plate 31. The hub 5a of the properly centered clutch disc 5 is then ready to be non-rotatably mounted on the input shaft of a variable speed transmission or on an intermediate shaft which transmits torque to the input shaft.

FIG. 4 shows that the thickness of the arms 21 and/or the thickness of those portions which engage the coil springs 10 is less than the thickness of the major part of the counterpressure plate 3. In other words, the axial dimensions of the arms 21 are reduced in comparison with the axial dimension of the major portion of the plate 3. Furthermore, the arms 21 are somewhat offset in the axial direction of the plate 3 away from the portion 13 of the primary flywheel 2 (i.e., away from the engine). Thus, the arms 21 are not disposed midway between the two major surfaces (one of which includes the friction surface 3a) of the plate 3. Since the plate 3 can be obtained from a plate-like steel blank or by stamping from a coiled or strip-shaped blank, the arms 21 can be made and finished in any one of a number of different ways. For example, the arms 21 can be formed by embossing or by resorting to a similar technique, in a single stage or in two or more successive steps, so that each arm is of one piece with the major central portion of the plate 3. In the illustrated embodiment, the arms 21 were obtained by removing from a suitable blank a partially finished plate 3 which contained a surplus of material (as seen in the radial direction), and the surplus was thereupon removed in a suitable machine tool (e.g., by turning) to form the arms 21. It is also possible to impart to the plate 3 an initial shape such that some material must be removed radially inwardly from the periphery of the partially finished plate 3 as well as that at least some material must be removed at the one and/or the other major surface of such plate. For example, at least some material can be removed only at the side of the friction surface 3a or at such side as well as at the periphery of the partially finished plate 3. The surface 3a is also finished by removing material from the respective major surface of the plate 3; this ensures that the quality of such friction surface is acceptable for proper frictional engagement with the adjacent friction lining 5c when the clutch 4 is engaged. That major surface of the plate 3 which is located opposite the friction surface 3a (i.e., the major surface which faces toward the main portion 13 of the primary flywheel 2 when the torque transmitting apparatus 1 is fully assembled) can remain untreated provided, of course, that such major surface is not called upon to perform one or more functions which would necessitate or render desirable a more accurate finish in a material removing machine.

It is further possible to impart to the arms 21 a final shape as a result of cold- or hot-forming without resorting to a material removing operation. For example, the arms 21 can be obtained by forging or drop forging; in fact, other parts of the plate 3 or the entire plate 3 can be finished or shaped by resorting to a shaping or forming operation (including forging) which does not involve removal of material from a blank to be converted into the plate 3. Thus, all that is necessary is to remove a stamping from a suitable blank and to thereupon treat the blank in a forging machine. A similar procedure can be resorted to for the making of the pressure plate 31.

The stamped plate 3 is already provided with various openings or windows (such as 36, 44 and 45) which are suitably distributed in a manner and for the purposes as already explained hereinbefore. These windows or openings extend in at least substantial parallelism with the axis of the counterpressure plate 3. For example, the radially outermost windows or openings 44 can constitute recesses or notches in the peripheral surface of the plate 3 around the friction surface 3a. The openings or windows 45 and 36 are disposed radially inwardly of the friction surface 3a, and the openings or windows 36 are located radially inwardly of the windows 45 to register with the openings 7 and windows 32, 35 preparatory to bolting of the primary flywheel 2 to the output element of an engine in a motor vehicle.

The central opening of the plate 3 is or can also be obtained by stamping, and the surface surrounding such opening can be finished in a suitable machine to snugly receive the outer race 17 of the antifriction bearing 6 or the thermally insulating cap 6a.

It is equally within the purview of the invention to enlarge the openings or windows of the plate 3 subsequent to separation of such plate from a blank. Alternatively, at least some of the aforediscussed openings or windows can be formed by resorting to suitable drilling or other material removing tools. For example, some of the openings or windows can be formed in a stamping machine at the time of making the plate 3, and the remaining openings or windows can be formed thereafter in a suitable drilling or like machine which removes material from the partially finished plate 3.

In order to facilitate proper assembly of the cover 30, plate 3 and sealing element 24 so that these parts are coaxial with and partially overlap each other, the cover 30 is provided with recesses or cutouts 47 (FIG. 4) and the sealing element 24 is provided with recesses or cutouts 48 (FIG. 4). The distribution of recesses 47 and 48 in the cover 30 and in the sealing element 24, respectively, is the same as the distribution of arms 21 at the periphery of the plate 3. These recesses ensure proper positioning of the parts 30, 24 and 3 relative to each other (as seen in the circumferential direction of the plate 3). The recesses 47 are provided in the axially extending radially outermost portion 29 of the clutch cover 30 and their depth (as measured axially of the cover 30 and away from the engine) is selected in such a way that the axial positioning of the parts 3, 30 relative to each other guarantees that the diaphragm spring 34 can bear upon the ring-shaped abutment 42 with a force which is required to maintain the pressure plate 31 in requisite clamping engagement with the adjacent friction lining 5c when the clutch 4 is engaged and the clutch disc 5 is properly installed between the plates 3 and 31.

In the embodiment which is shown in FIGS. 1 and 2–4, the cover 30 (which carries the pressure plate 31, the sealing element 25, the diaphragm spring 34 and the seats 37, 38) is pushed axially onto the plate 3 in a direction toward the engine and primary flywheel 2 (as viewed in FIG. 1) while the clutch disc 5 is located between the plates 3 and 31. The cover 30 is centered on the plate 3 and the next step involves mounting of the sealing element 24 from the other side of the plate 3 so that the radially outermost portion of the sealing element 24 surrounds and is centered on the axially extending portion 29 of the cover 30. The next step involves welding at 46 (FIGS. 2 and 3) which preferably results in bonding of the plate 3, sealing element 24 and substantially cylindrical portion 29 of the cover 30 to each other. However, it is also possible to bond the plate 3 only to the cover 30 or only to the sealing element 24, or to bond the sealing element 24 only to the cover 30. As shown in FIGS. 2 and 3, it is not necessary to provide a circumferentially complete welded seam 46, i.e., it suffices to weld circumferentially spaced apart sections or segments of the parts 3, 24 and 30 to each other. Welding techniques which can be resorted to in order to make the welded seam or seams 46 are preferably those which can ensure the formation of a welded seam through the portion 29 of the cover 30 and thereupon through the material of the axially extending radially outermost portion of the sealing element 24. It is presently preferred to employ a suitable laser welding apparatus; however, it is equally possible to resort to a spot welding or stored energy (capacitor discharge welding) technique. Still further, it is possible to avoid a bonding procedure and to establish a reliable connection between the plate 3, axially extending radially outermost portion of the sealing element 24 and axially extending radially outermost portion 29 of the clutch cover 30 by establishing a suitable form-locking connection, e.g., by employing bolts and nuts, screws, rivets or other suitable fasteners.

When the making of the welded seam or seams 46 (or of an analogous connection) is completed, the thus obtained unit is further completed by assembling it with the primary flywheel 2 prior to attachment to the output element (e.g., a crankshaft) of a combustion engine.

The sealing element 24 can be said to constitute one component of a friction generating assembly which cooperates with the damper 9 to oppose rotation of the primary flywheel 2 and the counterpressure plate 3 relative to each other. The other component of such friction generating assembly is the adjacent portion 13 of the primary flywheel 2.

Figure 1A:
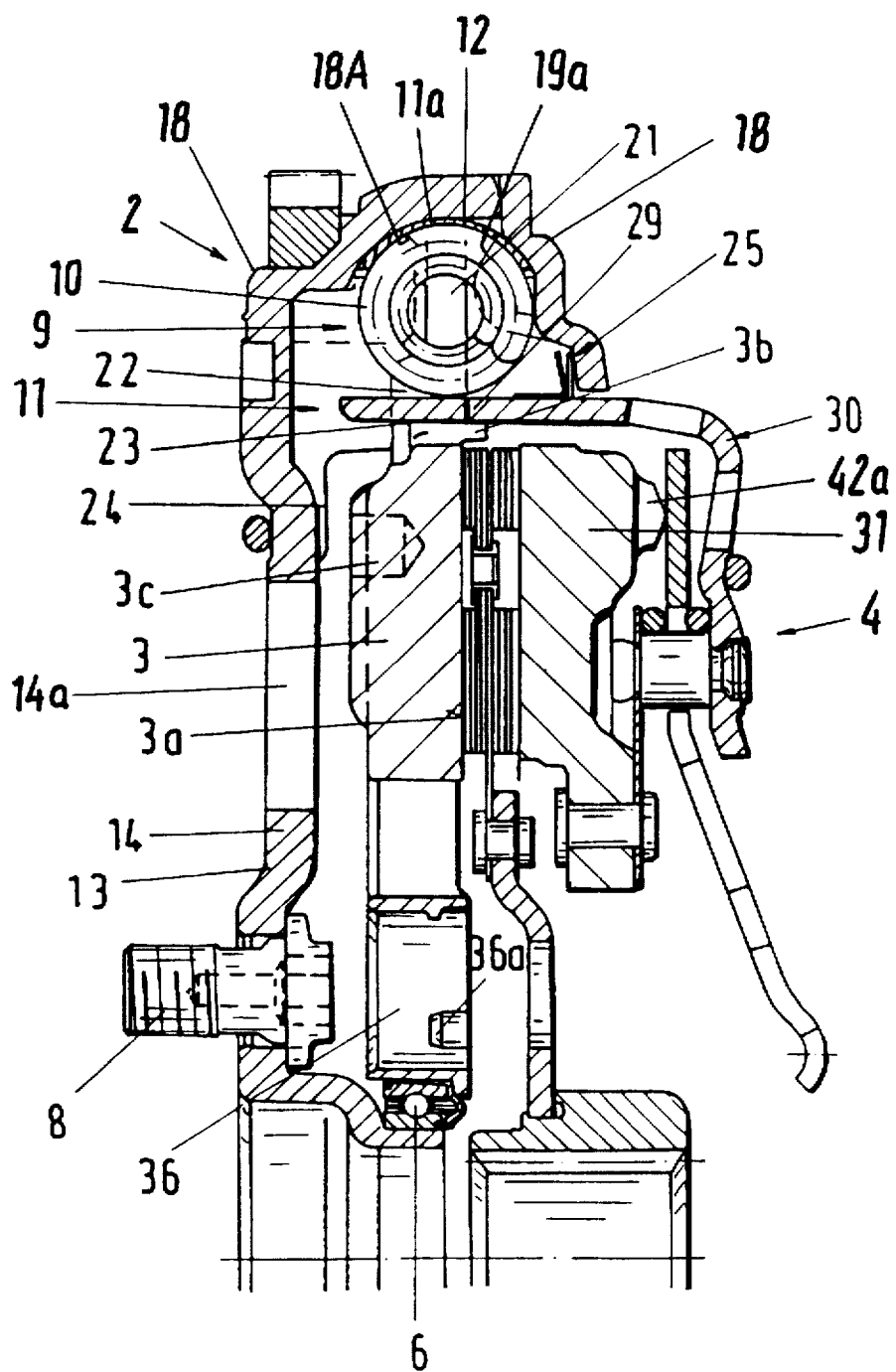
FIG. 1a is a similar fragmentary axial sectional view of a torque transmitting apparatus constituting a first modification of the apparatus which is shown in FIG. 1.

FIG. 1a shows a portion of a torque transmitting apparatus which constitutes a first modification of the apparatus 1 of FIGS. 1 and 2–4. All such parts of this modified apparatus which are identical with or are clearly analogous to the corresponding parts of the apparatus 1 of FIG. 1 are denoted by similar reference characters. The secondary flywheel (counterpressure plate) 3 is a forging and the radially outermost portion of the sealing element 24 lies flush against the adjacent major surface of the plate 3. The radially outermost portion of the sealing element 24 is centered by the internal surface of the axially extending radially outermost portion 29 of the cover 30 which extends axially to the left beyond the plate 3. The radially inner portion of the sealing element 24 bears against the main portion 13 of the primary flywheel 2. At least the main portion 13 of the flywheel 2 can be obtained from a blank consisting of a metallic sheet material. That portion of the primary flywheel 2 which is located radially inwardly of the radially innermost portion of the sealing element 24 is provided with suitably configurated aerating. ventilating or cooling windows or openings 14a for circulation of air which draws heat from the counterpressure plate 3. The windows or openings 14a are provided in the radially extending part 14 of the main portion 13.

The radially outermost portion 29 of the cover 30 is provided with recesses or cutouts (corresponding to those shown at 47 in FIG. 4) which receive the arms 21 of the plate 3 with a certain amount of play (as seen in the circumferential direction of the plate 3). In order to ensure reliable sealing of the compartment 12 of the chamber 11, the plate 3 is provided with axially extending protuberances in the form of lugs 3b or the like which are adjacent the radially innermost portions 23 of the arms 21 and extend in a direction away from the engine. i.e., toward the pressure plate 31 of the friction clutch 4. The lugs 3b are surrounded and contacted by the portion 29 of the cover 30.

The reference character 3c denotes in FIG. 1a balancing bore or recess which is provided in the left-hand surface of the plate 3. Proper balancing of a plate 3 which constitutes a forging is desirable and necessary in many instances.

The openings or windows 36 of the plate 3 receive radially inwardly displaced portions 36a of the plate 3; the portions 36a are configurated. dimensioned and/or distributed in such a way that they reliably prevent the heads of the fasteners 8 from passing through the respective windows 36.

The antifriction bearing 6 of FIG. 1a is or can be installed in such a way that it holds the plate 3 in a predetermined axial position relative to the primary flywheel 2. Practically the entire radially outermost portion of the secondary part of the composite flywheel assembly including the flywheel 2 and the plate 3 is axially yieldably supported by the resilient sealing elements 24 and 25. This ensures that the secondary flywheel can perform minor wobbling movements relative to the primary flywheel when the torque transmitting apparatus of FIG. 1a is in use and/or that the secondary flywheel can compensate for certain wobbling movements of the primary flywheel. Such ability of the secondary flywheel to perform minor wobbling movements and/or its ability to compensate for certain wobbling movements of the primary flywheel is desirable and advantageous because it reduces the stresses upon the connection between the primary flywheel and the output element of the engine.

FIG. 1a further shows a wear reducing insert 11a in the form of an arcuate through-shaped shroud or stop which is interposed between the internal surfaces of the walls 18, 19 and the radially outermost portions of the coil springs 10 forming part of the damper 9. The insert 11a can be of one piece or it can comprise a plurality of arcuate trough-shaped sections which are installed in the compartment 12. e.g., end-to-end in the circumferential direction of the plate 3. This insert 11a prevents the establishment of direct contact between the convolutions of the springs 10 and the adjacent surfaces of the walls 18 and 19 to thus reduce or eliminate the wear at least upon the primary flywheel 2. Moreover, the insert 11a can be made of a material which is compatible with the material of the springs 10 to thus reduce the wear upon the springs and thereby prolong the useful life of the entire torque transmitting apparatus.

The separately produced ring-shaped abutment 42 of FIG. 1 is replaced with a circumferentially complete abutment 42a or with a set of discrete abutments 42a which is or are of one piece with the pressure plate 31.

Figure 5:
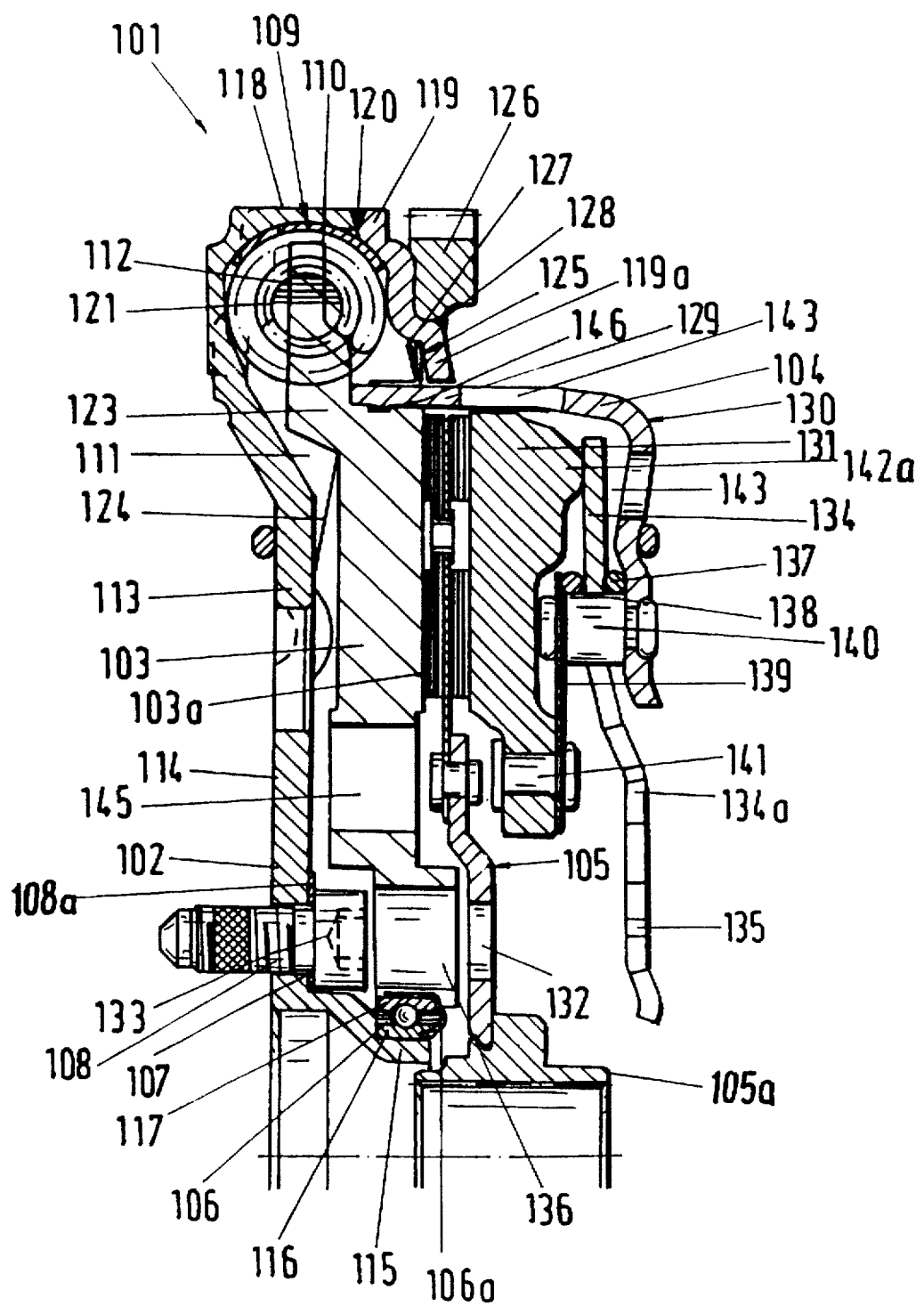
FIG. 5 is a fragmentary axial sectional view of a third torque transmitting apparatus.

FIG. 5 shows a portion of a third torque transmitting apparatus 101. All such parts of this apparatus which are identical with or clearly analogous to corresponding parts of the apparatus 1 of FIGS. 1 and 2–4 are denoted by similar reference characters plus 100. The twin flywheel assembly including the primary flywheel 102 and the secondary flywheel (counterpressure plate) 103 is fully assembled with the friction clutch 104 (including the clutch plate 105) at the manufacturing plant and is ready to be shipped to the user, e.g.. to an automobile making plant. All that is necessary is to affix the unit to the output element of an engine.

The arms 121 of the counterpressure plate 103 are offset axially of the flywheel assembly in a direction to the left. i.e.. toward the engine when the unit of FIG. 5 is properly affixed to an output element. This ensures that the axially extending central symmetry plane of the energy storing means including the coil springs 110 of the damper 109 is located close to or intersects the radially extending part 114 of the main portion 113 of the primary flywheel 102. In other words, the entire damper 109 is shifted away from the central plane of the counterpressure plate 103 toward the primary flywheel 2. The wall 118 is cupped (to a greater extent than the wall 18 of the primary flywheel 2) to accommodate a substantial part of each coil spring 110; such cupped portion of the wall 118 can be said to have a rather pronounced C-shaped cross-sectional outline radially outwardly of the radially extending part 114 of the main portion 113 of the primary flywheel 102. The open side of the wall 118 faces toward the wall 119 and the axially extending part of the wall 118 immediately adjacent the wall 119 surrounds at least the major part of the radially outermost portion of each coil spring 110. The wall 119 is welded to the wall 118, as at 120, and the wall 119 extends substantially radially and is provided with at least one external shoulder. One of the two illustrated external shoulders is surrounded by a starter gear 126 which is a press fit on or which can be welded or otherwise fixedly secured to the wall 119. The sealing element 125 is adjacent the inner side of the slightly frustoconical radially innermost portion 119a of the wall 119.

The sealing element 124 resembles a diaphragm spring and its radially outermost portion is centered by a shoulder at the adjacent surface of the counterpressure plate 103. namely at the zone 123 where the arms 121 merge into the main portion of the plate 103. The radially inner portion of the sealing element 124 bears against the radially extending part 114 of the primary flywheel 102. The sealing element 124 is at least slightly resilient.

The axially extending radially outermost portion 129 of the cover 130 surrounds a portion of the plate 103 all the way to the arms 121. The cover 130 can be provided with recesses or notches corresponding to the recesses 47 shown in FIG. 4 and receiving portions of the arms 121 on the plate 103. A desirable connection which prevents the cover 130 and the plate 103 from moving relative to each other in the axial direction of the clutch 104 as well as about the clutch axis is established at 146 where a portion of the surface of the cover is depressed into the adjacent portion of the plate 103 and/or vice versa. However, it is equally possible to connect the plate 103 with the cover 130 by one or more welded joints, by an adhesive, by rivets, by pins, by bolts or in any other suitable way.

The fasteners 108 are releasably centered in the respective openings 107 of the primary flywheel 102 by elastic and/or readily destructible retaining means 108a which are destroyed or expelled or both when the externally threaded shanks of the fasteners 108 are driven into complementary tapped bores in the output element of an engine, not shown. The retaining means 108a ensure that the fasteners 108 remain in optimum positions for attachment to an output element even if the diameters of the fasteners are smaller than the diameters of adjacent openings or windows 136 in the counterpressure plate 103. FIG. 5 shows the single illustrated fastener 108 in a position this fastener assumes when the attachment of the primary flywheel 102 to the output element of an engine is already completed.

The hub 105a of the clutch disc 105 includes a (leftmost) portion which extends into the substantially cylindrical central portion 115 of the primary flywheel 102. Such dimensioning of the parts 115 and 105a is desirable and advantageous if the axial length of the torque transmitting apparatus 101 (from the outer side of the primary flywheel 102 to the outer side of the radially extending portion of the cover 130) is to be reduced to a minimum. This may be highly desirable in certain types of compact motor vehicles.

Figure 6:
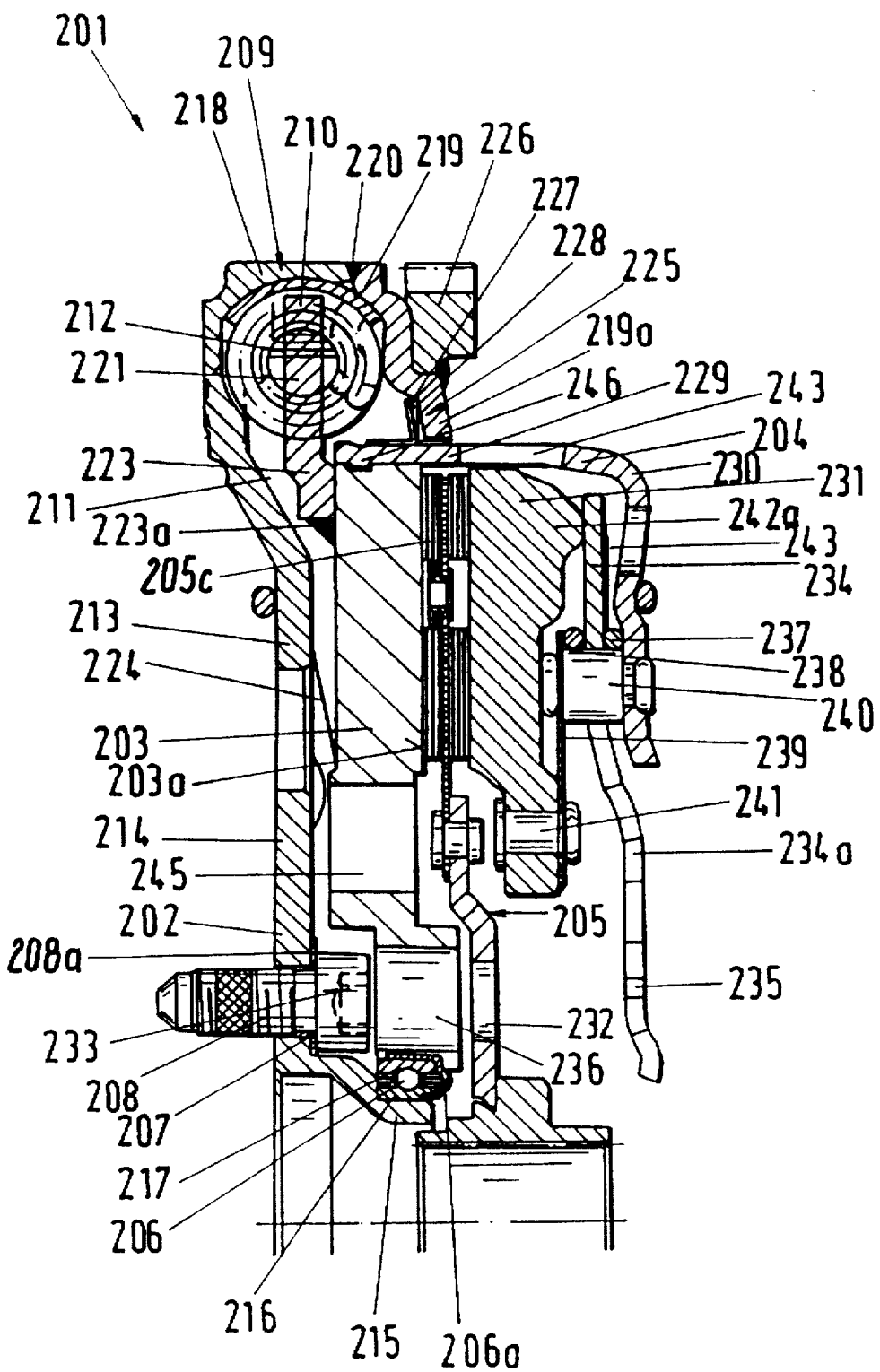
FIG. 6 is a fragmentary axial sectional view of a fourth torque transmitting apparatus.

All such parts of the torque transmitting apparatus 201 of FIG. 6 which are identical with or clearly analogous to corresponding parts of the torque transmitting apparatus 1 of FIGS. 1 and 2–4 are denoted by similar reference characters plus 200. The secondary flywheel (counterpressure plate) 203 of the composite flywheel assembly 202, 203 in the apparatus 201 is similar to the plate 103 of FIG. 5 except that the arms 221 are separately produced parts which are welded (at 223a) or otherwise reliably affixed to the main portion of the plate 203. The sealing element 224 again resembles a diaphragm spring having a radially inner portion which reacts against and is centered by a shoulder of the left-hand major surface of the plate 203 radially inwardly of the friction linings 205c. The sealing element 224 is at least slightly resilient and its radially outer or outermost portion bears against the inner side of the adjacent main portion 213 of the primary flywheel 202. The main portion 213 is or can be made of metallic sheet material.

An advantage of the plate 203 is that it can be produced (e.g., by stamping) with minimal losses of material. This is due to the fact that the arms 21 are separately produced parts so that it is not necessary to remove material from the plate 203 (radially inwardly and/or along one or both major surfaces) for the purpose of providing its radially outer portion with a requisite number of arms 221. Furthermore, it is possible to make the plate 203 of a first material and to make the arms 221 of a different second material. For example, the material of the arms 221 can be selected with a view to offer a more pronounced resistance to wear than the material of the major portion of the plate 203. This renders it possible to eliminate the step of hardening the arms 221; such step would be desirable or necessary if the arms 221 were of one piece with the major portion of the plate 203 right from the start and the major portion of the plate 203 would offer a relatively low resistance to wear.

Figure 7:
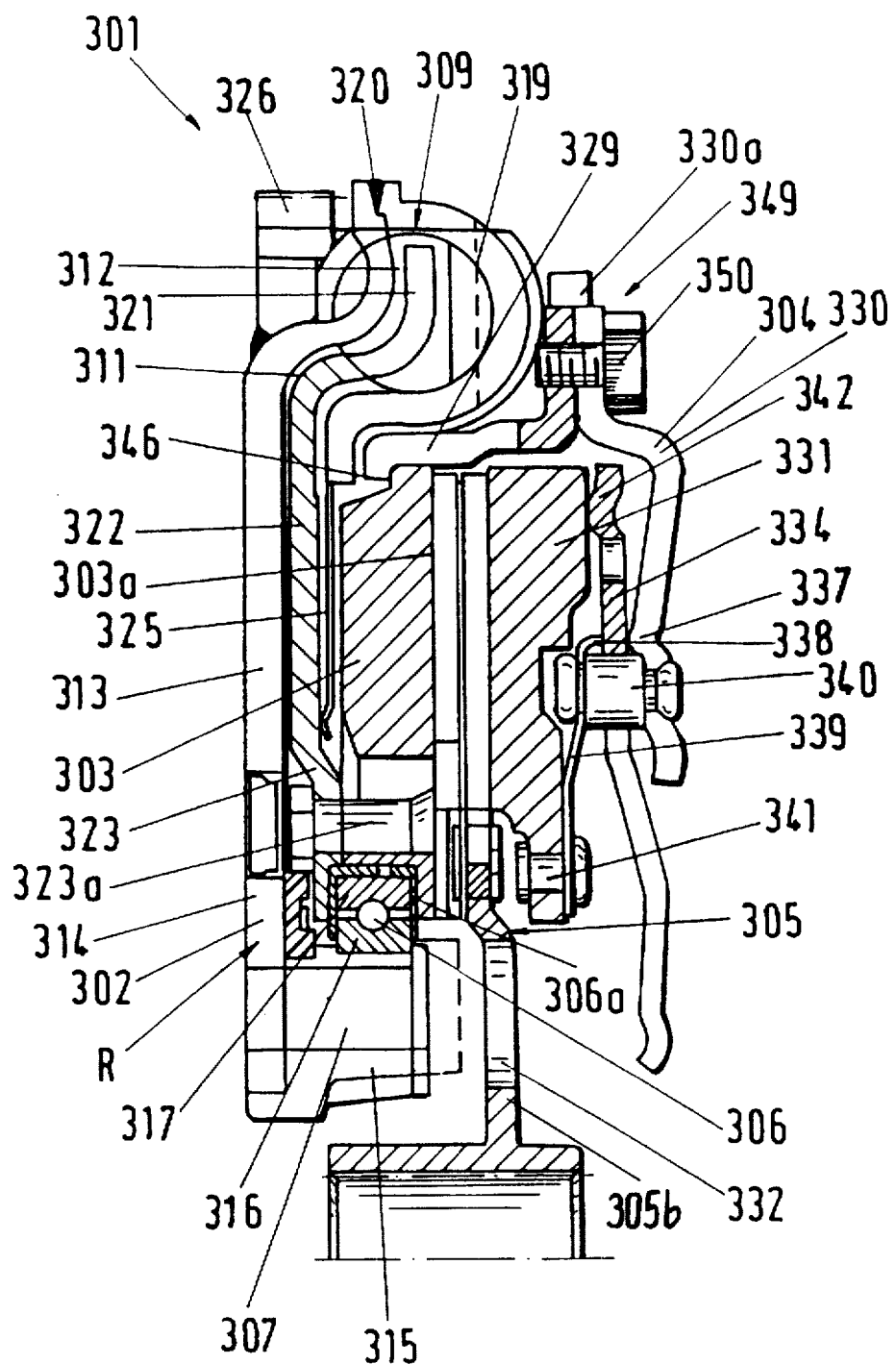
FIG. 7 is a fragmentary axial sectional view of a further torque transmitting apparatus.

All such parts of the torque transmitting apparatus 301 of FIG. 7 which are identical with or clearly analogous to corresponding parts of the torque transmitting apparatus 1 of FIGS. 1 and 2–4 are denoted by similar reference characters plus 300. The composite flywheel assembly of the apparatus 301 is not designed to be assembled with the cover 330 and certain other parts of the friction clutch 304 prior to attachment to the output element of an engine. Instead, the arrangement is such that the primary flywheel 302 and the secondary flywheel (counterpressure plate) 303 are affixed to the output element of the engine in a first step, the friction linings of the clutch disc 305 are then placed adjacent the friction surface 303a of the plate 303, and the cover 330 and pressure plate 331 of the friction clutch 304 are thereupon secured to the plate 303. The two-piece flywheel assembly including the parts 302, 303 can be replaced with a one-piece flywheel which performs the function of the counterpressure plate 303 and is also provided with means for affixing it to the output element of the engine.

The plate 303 of the composite flywheel assembly which is shown in FIG. 7 can be made by stamping in accordance with a feature of the present invention. The friction clutch 304 (or more specifically the parts 330, 331 and 334, 337, 338 of the friction clutch) is mounted on the plate 303, and the properly installed and centered clutch disc 305 of this friction clutch is interposed between the plates 303 and 331. An antifriction bearing 306 (here shown as a ball bearing with a single row of spherical rolling elements between the races 316 and 317) surrounds the radially innermost portion 315 of the primary flywheel 302 and is surrounded by the plate 303.

The radially outermost portion 329 is a separately produced part of the composite cover 330 and is caused to overlie (at 346) the periphery of the plate 303 prior to being secured to the major portion of the clutch cover by fastener means 349 including a set of suitably distributed bolts 350 (only one shown in FIG. 7).

The bearing 306 is installed radially outwardly of openings 307 for fasteners which are used to secure the primary flywheel 302 to the output element of an engine. The sealing cap 306a for the bearing 306 is made of two mirror symmetrical halves each of which has a substantially L-shaped cross-sectional outline and which shield the bearing 306 from heat generated at the friction surface 303a of the plate 303 when the clutch 304 is being engaged or disengaged.

A damper 309 between the primary flywheel 302 and the counterpressure plate 303 is installed in an annular chamber 311 and more specifically in the radially outermost portion or compartment 312 of this chamber. The chamber 311 is at least partially filled with a preferably viscous fluid such as a lubricant of pasty or oily consistency.

The damper 309 is provided in addition to a suitable friction generating assembly R which is interposed between the radially inner portions of the primary flywheel 302 and plate 303 to oppose at least certain stages of angular movement of the primary flywheel relative to the plate 303 and/or vice versa.

The primary flywheel 302 includes a main portion 313 which is preferably made of sheet material and the radially outermost part of which is welded to a starter gear 326.

The radially innermost part of the portion 313 is of one piece with or is affixed to the axially extending annular portion 315 which latter is inwardly adjacent the openings 307 for fasteners (not shown) serving to affix the primary flywheel 302 to the output element of an engine. The radially outermost part of the main portion 313 bounds a portion of the chamber 311 and its compartment 312. The bearing 306 is located behind a radially extending part 314 of the main portion 313 of the primary flywheel 302.

The plate 303 is a stamping (of steel) or a forging.

The radially outermost part of the portion 313 is welded to the wall 319, as at 320. The wall 319 is preferably made of metallic sheet material and has a substantially C-shaped cross sectional outline. The radially inwardly extending radially inner portion of the wall 319 carries a membrane-like sealing element 325 for the chamber 311.

The arms 321 are not of one piece with the radially outer portion of the plate 303; they serve to stress the coil springs of the damper 309 in the compartment 312 in response to angular movement of the primary flywheel 302 and plate 303 relative to each other. In the apparatus 301 of FIG. 7, the radially inner portions of the arms 321 (of only one is shown) are of one piece with a disc-shaped connecting portion 322 which, in turn, is connected with the main or central portion of the plate 303. To this end, the radially inner part 323 of the connecting portion 322 is affixed to the plate 303 by rivets 323a or in any other suitable way. The sealing element 325 extends into the relatively narrow clearance between the major or main portion of the plate 303 and the disc-shaped connecting portion 322. The radially innermost portion of the at least slightly or partly resilient sealing element 325 bulges toward the engine and bears against the connecting portion 322.

The illustrated connection (at 346) between the axially extending portion 329 of the clutch cover 330 and the plate 303 can be replaced by one or more rivets, bolts, pins, welded seams or any other suitable connecting means. When the primary flywheel 302 is affixed to the output element of an engine, it is already assembled with the damper 309, friction generating assembly R, bearing 306, thermal insulator means 306a, plate 303 and the axially extending portion 329 of the two-piece clutch cover 330. The cover portion 329 comprises a radially outwardly extending flange which abuts a similar flange 330a of the main portion of the cover 330 and is secured thereto by the fastener means 349 including the bolts 350.

The friction clutch 304 of FIG. 7 is a push-type clutch, i.e., the radially inwardly extending prongs of the diaphragm spring 334 must be depressed toward the engine in order to permit disengagement of pressure plate 331 from the adjacent friction lining of the clutch disc 305. The seat 337 for the adjacent outer side of the main portion of the diaphragm spring 334 is of one piece with the main portion of the cover 330. The other seat 338 is defined by the adjacent end portions of the leaf springs 339 which axially movably but non-rotatably couple the pressure plate 331 to the cover 330. The rivets 340 maintain the diaphragm spring 334 in engagement with the seats 337, 338, and the rivets 341 secure the adjacent end portions of the leaf springs 339 to the pressure plate 331.

The pressure plate 331 is or can be made of a steel which is capable of being precision treated in a stamping machine; alternatively, the pressure plate 331 can constitute a forging. The leaf springs 339 tend to move the pressure plate 331 axially and away from the adjacent friction lining of the clutch disc 305; at the same time, the springs 339 prevent the pressure plate 331 from performing any angular movements relative to the cover 330 and plate 303.

The radially outer portion of the diaphragm spring 334 is provided with an integral abutment 342 (which can be formed by stamping or the like) serving to bear against the adjacent side of the pressure plate 331 when the clutch 304 is engaged. The plate 331 can roll along the abutment 342. The latter can be replaced with a ring-shaped insert corresponding to the part 42 shown in FIG. 1, and such insert can be installed in or otherwise affixed to the diaphragm spring 334 or to the pressure plate 331. For example, a separately produced ring (42) can be inserted into a groove of and affixed to the pressure plate 331 to replace the one-piece abutment 342 on the diaphragm spring 334.

When the primary flywheel 302 is already affixed to the output element of an engine, the main portion of the cover 330 can be moved to a position of axial alignment with the separately produced axially extending portion 329 and the flange of the portion 329 is then affixed to the radially outermost part 330a of the main portion 330 by the bolts 350 of the fastener means 349 to thus complete the assembly of the apparatus 301 on the output element of the engine.

It is also possible to assemble all parts of the apparatus 301 prior to attachment of the primary flywheel 302 to the output element of an engine. All that is necessary is to provide the disc 305b of the clutch disc 305 with suitable windows or openings 332 (corresponding to the windows 32 in FIG. 1) and to provide (if necessary) suitable windows (corresponding to the windows 35 in FIG. 1) in or between the prongs of the diaphragm spring 334 so that a suitable tool can be used to affix bolts in the openings 307 to the crankshaft or another output element of an engine. Bolts or other suitable fasteners can be held in positions of readiness in the openings 307 in a manner as shown, for example, in FIG. 6 in order to even further simplify and automate the attachment of the apparatus 301 to an engine.

The improved torque transmitting apparatus is susceptible of numerous additional modifications without departing from the spirit of the invention. For example, the features of the apparatus 1 can be incorporated into the apparatus 101, 201 and/or 301, the features of the apparatus 101 can be incorporated into the apparatus 201 and/or 301 and so forth. Furthermore, numerous component parts of the improved apparatus can be modified, divided into two or more or combined into a lesser number of parts if this contributes to simplicity, utility, compactness and/or other desirable features of the improved apparatus. Still further, the apparatus of the present invention can embody certain features of apparatus disclosed in numerous granted United States Letters patent and/or disclosed in numerous pending United States patent applications of the assignee of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A torque transmitting apparatus comprising a rotary pressure plate; a rotary counterpressure plate coaxial with said pressure plate, said plates having confronting friction surfaces and at least one of said plates constituting a massive part made of a single piece of a metallic material and produced in accordance with one of the methods consisting of extruding, stamping and forging and at least one of said plates having torque transmitting means produced in accordance with one of the methods consisting of (a) stamping and finishing and (b) massive forming; and a clutch disc between said friction surfaces, said pressure plate being movable by energy storing means axially toward said counterpressure plate to thereby clamp said disc between said friction surfaces, said clutch disc having a first thickness as measured between said friction surfaces in the direction of the common axis of said plates and said massive part including a portion disposed at the respective friction surface and having a second thickness exceeding said first thickness.

2. The apparatus of claim 1, wherein said torque transmitting means is a separately produced component which is affixed to said pressure plate.

3. The apparatus of claim 1, wherein said torque transmitting means is of one piece with said pressure plate.

4. The apparatus of claim 1, wherein said torque transmitting means is provided on said counterpressure plate.

5. The apparatus of claim 4, wherein said torque transmitting means is a processed stamping forming part of said counterpressure plate.

6. The apparatus of claim 4, wherein said torque transmitting means is a forging or stamping forming part of said counterpressure plate.

7. The apparatus of claim 1, wherein at least one of said plates is a component part of a dry friction clutch.

8. The apparatus of claim 1, wherein said massive part includes at least one embossed portion.

9. The apparatus of claim 8, wherein said at least one embossed portion includes said torque transmitting means.

10. The apparatus of claim 1, wherein the massive part has at least one stamped out opening.

11. The apparatus of claim 10, wherein said at least one opening is configurated and dimensioned to receive and/or to permit passage of fastener means and/or tools.

12. The apparatus of claim 10, wherein said at least one opening is an aerating opening.

13. The apparatus of claim 1, wherein said pressure plate includes at least one embossed and/or stamped fastening portion for disengaging and/or torque transmitting means.

14. The apparatus of claim 1, wherein said pressure plate includes at least one embossed and/or stamped portion for at least one leaf spring.

15. The apparatus of claim 1, further comprising a rotary clutch component and at least one leaf spring connecting said pressure plate with said clutch component.

16. The apparatus of claim 15 wherein said clutch component comprises a clutch cover or housing.

17. The apparatus of claim 1, further comprising at least one energy storing element, and at least one abutment between said at least one energy storing element and said pressure plate.

18. The apparatus of claim 17, wherein said at least one energy storing element forms part of said energy storing means.

19. The apparatus of claim 17, wherein said at least one energy storing element includes a diaphragm spring.

20. The apparatus of claim 19, wherein said at least one abutment includes a shaped portion of said diaphragm spring.

21. The apparatus of claim 17, wherein said abutment is provided on said pressure plate.

22. The apparatus of claim 1, further comprising a clutch cover, said counterpressure plate comprising means for connecting said counterpressure plate with said clutch cover.

23. The apparatus of claim 22, wherein said connecting means comprises at least one contact surface extending in at least one of the directions including radially and axially of said counterpressure plate.

24. The apparatus of claim 1, wherein said counterpressure plate includes a radially outer portion having at least one stamped aerating opening.

25. The apparatus of claim 1, further comprising a flywheel assembly including a primary flywheel and a secondary flywheel, said secondary flywheel including said counterpressure plate.

26. The apparatus of claim 25, wherein said counterpressure plate includes a radially outer portion and further comprising at least one abutment for an energy storing element, said at least one abutment being disposed at said radially outer portion.

27. The apparatus of claim 26, wherein said at least one abutment is of one piece with said counterpressure plate.

28. The apparatus of claim 26, wherein said at least one abutment is a stamped portion of said counterpressure plate.

29. The apparatus of claim 26, wherein said at least one abutment has at least one surface extending substantially radially of said counterpressure plate.

30. The apparatus of claim 26, further comprising a rotary clutch cover connected with at least one of said plates, said at least one abutment being disposed at least in part radially outwardly of said clutch cover.

31. The apparatus of claim 1, wherein said counterpressure plate includes a plurality of abutments for energy storing elements, said abutments being spaced apart from each other in a circumferential direction of said counterpressure plate.

32. The apparatus of claim 1, further comprising a rotary flywheel assembly including a primary flywheel and a secondary flywheel, said secondary flywheel including said counterpressure plate, said primary flywheel defining at least a portion of a chamber and further comprising at least one resilient energy storing device disposed in said chamber, said counterpressure plate being provided with at least one abutment for said energy storing device.

33. The apparatus of claim 32, wherein said energy storing device tends to move radially outwardly away from the common axis of said plates in response to rotation of said flywheel assembly, and further comprising at least one stop provided at said chamber and being engaged by said energy storing device at least while said energy storing device is acted upon by centrifugal force.

34. The apparatus of claim 33, wherein said energy storing device includes a radially outer portion and said at least one stop includes at least one wear reducing insert between said radially outer portion and said primary flywheel.

35. The apparatus of claim 1, further comprising a clutch cover and means for connecting said clutch cover to said counterpressure plate.

36. The apparatus of claim 1, further comprising an annular chamber adjacent said counterpressure plate and at least one sealing element for said chamber, said at least one sealing element being provided on said counterpressure plate.

37. The apparatus of claim 1, further comprising an annular chamber, a clutch cover adjacent said chamber and a sealing element for said chamber, said sealing element being provided on said clutch cover.

38. The apparatus of claim 1, further comprising a rotary flywheel assembly including a primary flywheel and a secondary flywheel, said secondary flywheel including said counterpressure plate and said primary flywheel defining at least a portion of an annular chamber, and further comprising a clutch cover and a sealing element for said chamber, said sealing element being provided on one of said counterpressure plate and said clutch cover and including a resilient radially inner portion bearing against said primary flywheel in the axial direction of said plates.

39. The apparatus of claim 1, further comprising a rotary flywheel assembly including a primary flywheel and a secondary flywheel, one of said flywheels defining at least a portion of an annular chamber and further comprising a friction generating device between said flywheels, said device including a sealing element for said chamber.

40. The apparatus of claim 1, further comprising a clutch cover and a form-locking connection between said counterpressure plate and said clutch cover, said connection being operative at least in the circumferential direction of said plates.

41. The apparatus of claim 1, further comprising an annular chamber adjacent said counterpressure plate, a sealing element for said chamber and a clutch cover, said sealing element and said clutch cover being coaxial with said counterpressure plate and at least one of said counterpressure plate, said sealing element and said clutch cover at least partially overlying at least one other of said counterpressure plate, said sealing element and said clutch cover in the axial direction of said plates.

42. The apparatus of claim 1, further comprising a clutch cover and a sealing element coaxial with said counterpressure plate and with said clutch cover, at least one of said counterpressure plate, said sealing element and said clutch cover being bonded to at least one other of said counterpressure plate, said sealing element and said clutch cover.

43. The apparatus of claim 42, wherein said sealing element, said clutch cover and said counterpressure plate are welded to each other.

44. The apparatus of claim 42, wherein the clutch cover is bonded on a single welding operation.

45. The apparatus of claim 42, wherein the clutch cover is bonded on a laser welding machine.

46. The apparatus of claim 42, wherein at least one of said sealing element, said clutch cover and said counterpressure plate includes segments spaced apart from each other in the circumferential direction of said plates and welded to another of said sealing element, said clutch cover and said counterpressure plate.

47. The apparatus of claim 42, wherein the clutch cover is bonded by welding substantially radially inwardly toward the common axis of said plates.

48. The apparatus of claim 1, further comprising a first flywheel connectable with a combustion engine, a second flywheel rotatable relative to said first flywheel, including said counterpressure plate and connectable with a transmission by a friction clutch, antifriction bearing means interposed between said freewheels, and a damper arranged to oppose rotation of said flywheels relative to each other, said clutch comprising said pressure plate and said clutch disc and said pressure plate constituting said at least one plate.

49. The apparatus of claim 48, wherein said clutch disc is connected to said transmission.

50. The apparatus of claim 48, wherein said torque transmitting means is a separately produced component which is affixed to said pressure plate or a massively formed part of and of one piece with said pressure plate.

51. The apparatus of claim 48, wherein said torque transmitting means is a part of said counterpressure plate, said torque transmitting means constituting a processed part or a stamped, forged or extruded part of said counterpressure plate.

52. The apparatus of claim 48, wherein said clutch is a dry friction clutch.

53. The apparatus of claim 1, wherein said at least one plate has a portion disposed at the respective friction surface and having a first thickness as seen in the direction of the common axis of said plates, said torque transmitting means having a second thickness less than said first thickness.

54. A torque transmitting apparatus comprising a rotary pressure plate; a rotary counterpressure plate coaxial with said pressure plate, said plates having confronting friction surfaces and at least one of said plates constituting a massive part made of a single piece of a metallic material and produced in accordance with one of the methods consisting of extruding, stamping and forging and said pressure plate being of one piece with torque transmitting means produced in accordance with one of the methods consisting of (a) stamping and finishing and (b) massive forming, said at least one plate having a portion disposed at the respective friction surface and having a first thickness as seen in the direction of the common axis of said plates, said torque transmitting means having a second thickness less than said first thickness and including projections extending substantially radially of said common axis; and a clutch disc between said friction surfaces, said pressure plate being movable by energy storing means axially toward said counterpressure plate to thereby clamp said disc between said friction surfaces.

\* \* \* \* \*